US012431018B2

(12) United States Patent
Bandi et al.

(10) Patent No.: US 12,431,018 B2
(45) Date of Patent: Sep. 30, 2025

(54) SYSTEMS AND METHODS FOR VEHICLE SMART NEGOTIATION AND COOPERATION

(71) Applicant: FORD GLOBAL TECHNOLOGIES, LLC, Dearborn, MI (US)

(72) Inventors: Krishna Bandi, Farmington Hills MI, MI (US); Ivan Vukovic, Birmingham, MI (US); Jovan Milivoje Zagajac, Ann Arbor, MI (US); Sathyanarayana Chary Palakonda, Northville, MI (US); Syed Amaar Ahmad, Canton, MI (US); Brennan Hamilton, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 17/982,803

(22) Filed: Nov. 8, 2022

(65) Prior Publication Data

US 2024/0153381 A1 May 9, 2024

(51) Int. Cl.
*G08G 1/0965* (2006.01)
*G08G 1/0967* (2006.01)
*G08G 1/0968* (2006.01)

(52) U.S. Cl.
CPC ..... *G08G 1/0965* (2013.01); *G08G 1/096741* (2013.01); *G08G 1/096791* (2013.01); *G08G 1/0968* (2013.01)

(58) Field of Classification Search
CPC ........... G08G 1/0965; G08G 1/096741; G08G 1/017; G08G 1/0112; G07C 5/008
See application file for complete search history.

(56) References Cited

U.S. PATENT DOCUMENTS 10,121,370 B2 11/2018 Elsheemy
11,076,262 B2 7/2021 Vanderveen et al.
(Continued)

FOREIGN PATENT DOCUMENTS

EP 1121245 B1 12/2008
WO 2007122607 A3 4/2009
WO 2021146891 A1 7/2021

*Primary Examiner* — Wade Miles
*Assistant Examiner* — Mohammed Yousef Abuelhawa
(74) *Attorney, Agent, or Firm* — Joseph Zane; Brooks Kushman P.C.

(57) ABSTRACT

An enforcement vehicle receives vehicle broadcasts from motorist vehicles, including vehicle identification information. The enforcement vehicle presents the identification information in a selectable manner on a display and receives selection of one of the motorist vehicles. The enforcement vehicle sends a communication request to the selected motorist vehicle and receives confirmation from the motorist vehicle, resulting in an open communication channel. Further, enforcement vehicle receives identification of information to be provided from the motorist vehicle and sends an information request for the identified information. Responsive to receiving a response to the information request, the enforcement vehicle, or a process associated therewith, determines whether information included in the response indicates compliance with a predefined requirement, and, responsive to non-compliance, alerts an occupant of the enforcement vehicle of the existence of and at least one characteristic of the non-compliance.

12 Claims, 5 Drawing Sheets

(56) References Cited

U.S. PATENT DOCUMENTS

| | | | | |
|---|---|---|---|---|
| 11,119,492 | B2 | 9/2021 | Wang et al. | |
| 2006/0200379 | A1 | 9/2006 | Biet | |
| 2011/0137521 | A1* | 6/2011 | Levi | B60Q 1/544 701/36 |
| 2013/0297387 | A1* | 11/2013 | Michael | G06Q 30/02 705/13 |
| 2015/0243165 | A1* | 8/2015 | Elsheemy | G08G 1/096775 340/906 |
| 2016/0039426 | A1 | 2/2016 | Ricci | |
| 2017/0127230 | A1* | 5/2017 | Enriquez | H04W 4/48 |
| 2017/0132922 | A1* | 5/2017 | Gupta | H04L 67/12 |
| 2018/0174446 | A1* | 6/2018 | Wang | G08G 1/096716 |
| 2018/0261014 | A1* | 9/2018 | Seo | G08G 1/09626 |
| 2023/0019827 | A1* | 1/2023 | Chen | G08B 25/10 |
| 2023/0116941 | A1* | 4/2023 | Torres | H04W 12/47 707/722 |
| 2023/0306832 | A1* | 9/2023 | Khosla | G08G 1/096741 |

* cited by examiner

SYSTEMS AND METHODS FOR VEHICLE SMART NEGOTIATION AND COOPERATION

TECHNICAL FIELD

The illustrative embodiments generally relate to systems and methods for vehicle smart negotiation and cooperation.

BACKGROUND

Vehicular data recordation and communication capabilities create fresh opportunities to examine old paradigms. Advanced vehicles may include the capability to capture continual data relating to speed, steering, obstructions, etc. Further, these vehicles can store driver documentation, such as licensure, insurance and registration, in a vehicle memory. Since many such vehicles can also communicate with other vehicles either directly or through intermediaries, such as the cloud, there is an opportunity to establish an increased-trust relationship in an enforcement proceeding and to handle many routine proceedings with limited direct human to human interaction.

Many drivers, especially late at night, are leery of pulling over for enforcement for a variety of reasons. It is difficult to see passing vehicles when stopped, it is difficult to identify suitable stopping locations, and the stopping locations available may often be somewhat remote. Similarly, many enforcement officers may view such situations as potentially dangerous, not knowing anything about the occupants of a vehicle which they are stopping. These scenarios can lead to heightened emotions and disfavored outcomes.

In other circumstances, drivers may be stopped for fairly routine reasons, many times without a need to issue a citation. Again, because of a stigma around such stoppages, these situations can lead to general unease and tend to engender dislike and distrust between motorists and enforcement. Often times, if a motorist is in general compliance, such situations could result in no more than a courtesy alert, but angst and emotion can often escalate the outcome. Additionally the long duration of such stops, as an officer walks to and from a patrol vehicle, lead to increased chance of an unfavorable scenario involving a passing motorist.

SUMMARY

In a first illustrative embodiment, a vehicle includes one or more processors configured to broadcast a vehicle identifier including vehicle identification information and receive a communication request from an enforcement vehicle, including designation of the request as having come from an enforcement vehicle. The one or more processors are further configured to verify that the request is from an enforcement vehicle, based on information included in the request and, responsive to verification, present a selectable option to grant the communication request, including identification of any vehicle information to be shared responsive to the request. Also, the one or more processors are configured to, responsive to acceptance of the request, open a communication channel and automatically provide information requested by the request to the enforcement vehicle over the communication channel.

In a second illustrative embodiment, an enforcement vehicle includes one or more processors configured to receive a plurality of vehicle broadcasts from motorist vehicles, each including vehicle identification information. The one or more processors are also configured to present at least an aspect of the identification information in a selectable manner on a display of the enforcement vehicle, allowing for selection of one or more of a plurality of vehicles identified by the broadcasts and receive selection of one or more of the plurality of vehicles. Additionally, the one or more processors are configured to send communication requests to the selected one or more vehicles, including designation of the request as having come from the enforcement vehicle and receive confirmation from at least one vehicle with which communication was requested, resulting in an open communication channel with the at least one vehicle. Further, the one or more processors are configured to receive identification of information to be provided from the at least one vehicle and send an information request to the at least one vehicle for the identified information. Also, the one or more processors are configured to, responsive to receiving a response to the information request, determine whether information included in the response indicates compliance with at least one predefined requirement, and, responsive to non-compliance with the at least one predefined requirement, alert an occupant of the enforcement vehicle of the existence of and at least one characteristic of the non-compliance.

In a third illustrative embodiment, a method executable by one or more processors of an enforcement vehicle includes receiving a plurality of vehicle broadcasts from motorist vehicles, each including vehicle identification information and presenting at least an aspect of the identification information in a selectable manner on a display of the enforcement vehicle, allowing for selection of one or more of a plurality of vehicles identified by the broadcasts. The method also includes receiving selection of one or more of the plurality of vehicles, sending communication requests to the selected one or more vehicles, including designation of the request as having come from the enforcement vehicle and receiving confirmation from at least one vehicle with which communication was requested, resulting in an open communication channel with the at least one vehicle. The method further includes receiving identification of information to be provided from the at least one vehicle and sending an information request to the at least one vehicle for the identified information. The method includes, responsive to receiving a response to the information request, determining whether information included in the response indicates compliance with at least one predefined requirement, and, responsive to non-compliance with the at least one predefined requirement, alerting an occupant of the enforcement vehicle of the existence of and at least one characteristic of the non-compliance.

DETAILED DESCRIPTION

Figure 1:
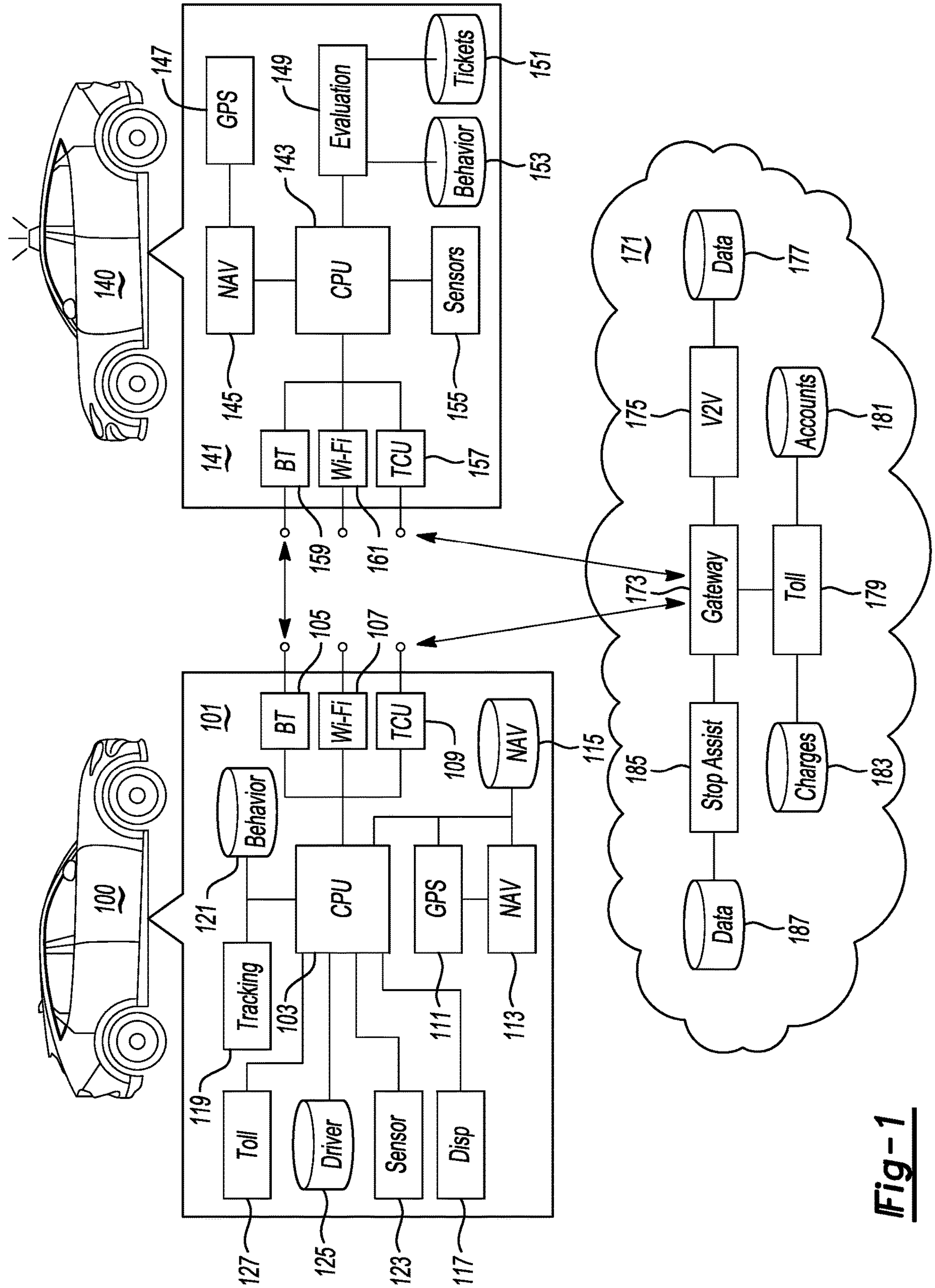
FIG. 1 shows an illustrative example of motorist and enforcement vehicular systems and cloud-based assistance.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

It is a preference of enforcement to enter any situation in as deescalated a state as possible. While many enforcement scenarios are difficult to de-escalate, vehicle technology can be updated and utilized in unique manners to assist in efficiency and de-escalation of the very common enforcement scenario of a traffic encounter. The illustrative embodiments propose technological paradigms for creating enhanced communication and interface in such situations, which may result in an increase in favorable outcomes and a general increase in the amount of ease felt during these situations. Moreover, increases in efficiency of communication and guidance can free resources for other uses and help drivers feel that these encounters are less of an imposition.

Vehicular communication and data-sharing capability can be updated and leveraged in a variety of factors in enforcement scenarios, which can help increase the public perception of enforcement and lead to increased tolerance for enforcement encounters. Further, if the number of direct encounters can be reduced, along with the duration of encounters that still occur, this can further reduce the opportunity for incidents and unfavorable outcomes.

The illustrative embodiments propose voluntary data sharing and communication for enforcement proceedings and between enforcement and motorist vehicles. Other embodiments include preservation of state data for motorist protection and use in incident analysis, use of state data to more accurately assess road usage charges and compliance for toll roads, and guidance and assistance in enforcement proceedings for mutually agreed-upon stopping locations.

FIG. 1 shows an illustrative example of motorist and enforcement vehicular systems and cloud-based assistance. In this example, a motorist vehicle 100 includes an onboard computing system, and example of which is shown as 101. In this illustrative computing system, the vehicle includes one or more processors 103, and a variety of possible communication options. Here, the options include BLUETOOTH 105, Wi-Fi 107 and a telematics control unit (TCU) 109 that can provide longer-range cellular communication.

An enforcement vehicle 140 may also include an onboard computing system 141, that also has one or more processors 143 and comparable or similar communication systems. For example, the enforcement vehicle 140 may also include BLUETOOTH communication 159, and this communication can be used for vehicle to vehicle (V2V) communication, such as direct communication with vehicle 100. BLUETOOTH can allow for both conveyance of information and live communication between vehicles 100, 140, which can allow a verbal and/or video interaction between a motorist and enforcement vehicle prior to a stop even occurring. By providing an initial dialogue, officers can begin to reduce the anxiety associated with a stop, and motorists can demonstrate compliance and posture, which can assist in keeping any stop, if a stop is deemed necessary, as mundane and benign as possible, leading to better outcomes for all parties involved.

Wi-Fi transceiver 161 can also be used for Wi-Fi communication between vehicles and/or communication using infrastructure transceivers, which can allow for longer-range communication to be maintained between motorists and enforcement. This also can be useful if there is a designated point for a stop that is several miles ahead, this allows both vehicles to continue to travel to the stop point while keeping communication open, which reduces the chances that the officer will think that the motorist is attempting to evade.

TCU 157 allows for even longer-range communication and for data sharing when interference may prevent BLUETOOTH or Wi-Fi from being usefully used. This also allows for both vehicles to communicate with the cloud 171 as an intermediary, wherein common services, such as stopping point recommendations, can be conveyed to both vehicles and assurances of message delivery and intended compliance can be confirmed. Again, this can all serve to maintain a calm composure of all parties associated with routine enforcement and alert proceedings.

In addition to the communication capabilities, the vehicle 100 may include a global positioning system (GPS) receiver 111 and navigation engine 113. This functionality could also be provided by a mobile device communicating with the vehicle 100, but the vehicle 100 could further include a navigation data repository, tracking (if an occupant desires or if mandated) recent driving behavior, including stops, speeds, signaling, lane-keeping, etc. There are countless scenarios wherein a driver may be willing to share this data with enforcement officers, to demonstrate, for example, that a stop was fully executed or that any observed speeding was momentary or for the purposes of passing another vehicle. For example, a driver may demonstrate that they maintained the speed limit for 99% of a journey, and that in one temporary and momentary instance, when they exceeded the speed above a tolerable threshold, the officer happened to observe them.

The vehicle may further include a variety of sensors 123, which can record both usage data and observances about surroundings. This also can be stored in a data repository 121, which can demonstrate the reasonableness of driver behavior, such as swerving around a pothole or obstruction identified by the data 121. A behavioral process 119 can track the data as gathered, and save, for example, both recent data and any data observed when anomalous driving is observed. That data may reveal the presence of other dangerous motorists, animals, potholes or other obstructions, and this may assist the driver in not receiving a citation and/or in later explaining the need for behavior if a citation is challenged. Whether or not to share this data can be entirely voluntary for the driver, unless otherwise mandated in it collection and/or sharing. Storage of such data can allow a driver to return to the data to examine the situation surrounding an incident and determine whether or not it is reasonable to challenge a citation or attempt to explain it in a manner that may mitigate the citation, and the data can serve as unbiased proof of the truth of statements.

Sensor data, tracking of anomalous behavior and recordation of associated data may also be useful in a multi-vehicle incident, where different parties tend to tell different stories. This can help sort out fault, as well as resolve other insurance disputes, and can help drivers who were wronged received proper credit. Even drivers who were in the wrong may not always recognize that fact, and the data may demonstrate to those people that they were at fault, encouraging them to accept responsibility for their mistake.

Driver data 125 can include common documentation associated with one or more regular drivers of a vehicle 100. This can include the registration for the vehicle, which is driver-agnostic, as well as insurance and licensure. Correlation of the license and insurance to a given driver can be done through driver-detection methods not generally covered in great detail by this disclosure, but any suitable method of driver detection can be used to associate correct documentation with a driver.

This can include, for example, identification of wireless devices, present in the vehicle, present in a driver location and/or used as a key. Driver identification may also be facilitated by a limited set of key features associated with a driver and used in conjunction with vehicle sensors, such as weight and/or camera sensors—that is, because a common set of drivers for a vehicle is often no more than three or four people maximum, it does not necessarily require significant distinction between these parties in order to identify one from another.

Correlation of licensure to a driver may be useful for increasing efficiency of enforcement encounters and reducing the likelihood of citation. If a driver shared a license (which typically includes a picture) and live video or a photograph from the vehicle 100 with the enforcement vehicle 140, this could allow an officer to determine that the correct license was present and valid for the identified driver, simply by comparing the photograph to the image or video. In other instances, a machine learning process can compare the data and simply provide the officer with a positive or negative correlation, if drivers do not want to share their video feeds or photographs. This can essentially anonymize the driver but also confirm that the driver has a valid license stored electronically in the vehicle or stored elsewhere, such as in the cloud.

Even if driver data is stored in the cloud, a driver may be required to consent to sharing of the data. Drivers could also use, for example, a measurable identifier, such as a biometric, when starting a vehicle. This could directly and correctly correlate the correct data, and prove that the driver has permission to share the data. Such interaction could also be achieved with a phone prompt for a comparable measurable or a password or other confirmation.

In still another example, the vehicle 100 includes toll-calculation capability—which includes an ability of a vehicle to track toll road usage and instruct payment of correct tolling. This allows for granular toll analysis and can allow for toll roads to be created that do not have to involve metered interchanges, which can often force a driver tens of miles off a preferred route because of controlled entry and exit points. By charging a driver only for the portions of roads used, tolls can be more accurate, more fair and more useful. Further, road usage can actually be reduced by allowing drivers to exit closer to a true destination.

Enforcement vehicle 140 may also includes GPS 145 and navigation systems 147, as well as the ability to store this data locally and/or in the cloud. These systems can be useful to the officer to establish how long a motorist was followed and what behavior was observed while following. Vehicle sensors 155 can track both general and anomalous behavior in both observed vehicles and an officer vehicle—for example, if an observed vehicle swerves unexpectedly, and the officer gives pursuit, the officer could also swerve at a comparable location because of a road obstruction. Even if the officer did not realize that this was the root cause of the observed behavior, a comparison of motorist and officer data could reveal that both took anomalous action in near proximity to a location, which could lead to a reduce chance for citation or potentially even require very little interaction between the two vehicles at all. For example, an officer could send a vehicle data request for licensure and registration, the motorist could comply with a simple affirmative, and then the motorist, believing they had done nothing wrong, could also share requested maneuvering data. The officer's vehicle could use behavioral analysis 149 to determine the correlation between the data (officer and motorist) and that could be the end of the encounter.

The behavioral analysis process 149 can also observe and analyze vehicular behavior observed with sensors 155, which can include storage of the behavior 153 and correlation to citations 151, if needed. Sensors can also observe other passing vehicles and surrounding vehicles as well, and so, to use the preceding example, if the officer vehicle observed multiple other vehicles exhibiting comparable behavior, even if the officer did not, the behavioral analysis may note this for the officer. This can turn an incorrect stoppage (of a motorist swerving around an obstacle) into an opportunity to identify the real problem, which is the obstacle itself, and allow the officer to rectify the obstacle and/or request assistance in doing the same.

For example, an enforcement vehicle may be able to monitor various vehicles for sustained high speeds (e.g., representative of speeding as opposed to passing or other temporary increased speed) or high tracking error. A high tracking error is a displacement between a predicted position and an actual location, and can be indicative of erratic driving. Multiple hard braking or sharp lane changes can cause such tracking errors, and may be indicative of a vehicle that bears observation or for which a smart negotiation may be useful. Using such factual data as a backstop for an encounter can also help diminish any perception that enforcement is or appears to be arbitrary.

A backend system 171 can provide a variety of backend vehicle services, which can include assisting in V2V communication, data storage and analysis, data sharing and tolling services. A gateway 173 can route corresponding requests or responses to the appropriate process or entity.

In this example, the cloud 171 provides V2V communication 175 services, which can assist in communication when distances or interference become an issue. This can allow a motorist and officer to remain in communication, demonstrating compliance, while also allowing correct driving to continue to an agreed-upon stopping point. This can also be used for data sharing when the local connection (e.g., BLUETOOTH) has been lost, by providing cloud-stored driver data 177 to the enforcement vehicle 140 upon instruction by the authorized possessor associated with the data.

So, for example, an officer could attempt to effectuate a stop on a six lane highway where traffic was traveling at 70 miles an hour. While a motorist may be happy to comply, they also may not be overly excited about parking alongside so much fast-moving traffic. At the same time, if they attempt to exit the highway, they may be perceived as evading. And, if they tried to control their speed and driving patterns to stay in BLUETOOTH communication with the officer, this could create issues for the other traffic still attempting to travel in routine patterns.

If vehicle to vehicle communication were provided by the cloud, the motorist could convey an intent to exit and stop at a better location, and/or the cloud could suggest a mutually agreed-upon location. This could be input as a destination for the vehicles, and then the motorist could travel to the location in a reasonable manner without being inconsistent with traffic, and without the officer believing that evasion was being attempted. Meanwhile, as the vehicle 100 travels, the motorist could share all relevant documentation and behavior data as requested and desired to be shared, and by the time the destination was reached, the encounter could take less than a few minutes, or may not be necessary at all, as previously explained.

In a tolling paradigm, the cloud 171 could include a tolling process 179 that tracks user travel on toll roads (with user permission) and controls user account 181 and charging data 183. This could allow users to more efficiently use toll roads and increase the possibility of toll road usage without controlled interchanges. If the user did not want to share data, the vehicle could calculate mileage and/or segment usage and simply instruct the cloud to debit the account of the user 181 for the corresponding charges 183, without having to reveal where exactly the user had been traveling. This could be further anonymized by grouping comparably charged distances or segments together—for example, a user could be charged for one TYPE A segment and one TYPE B segment, but the database could have a hundred of each segment. In another example, if anonymization of travel data was desired, the vehicle could store the relevant charge information and simply convey the price, or could request the charges for a variety of segment types, including those traveled, and could sum the relevant types and convey the total charge, while obscuring the actual segments traveled through over-requesting information including irrelevant information.

In still a further example, the cloud 171 can assist in an enforcement stop 185, which can include gathering and storing all data 187 leading up to the stop and during the stop. Data could be gathered and stored with user consent unless mandatory, and enforcement data may be mandatorily gathered and stored. This can create an accessible (with correct permissions) record of the entire incident and ensure that the truth of the matter, at least from a data perspective, is presented.

Figure 2:
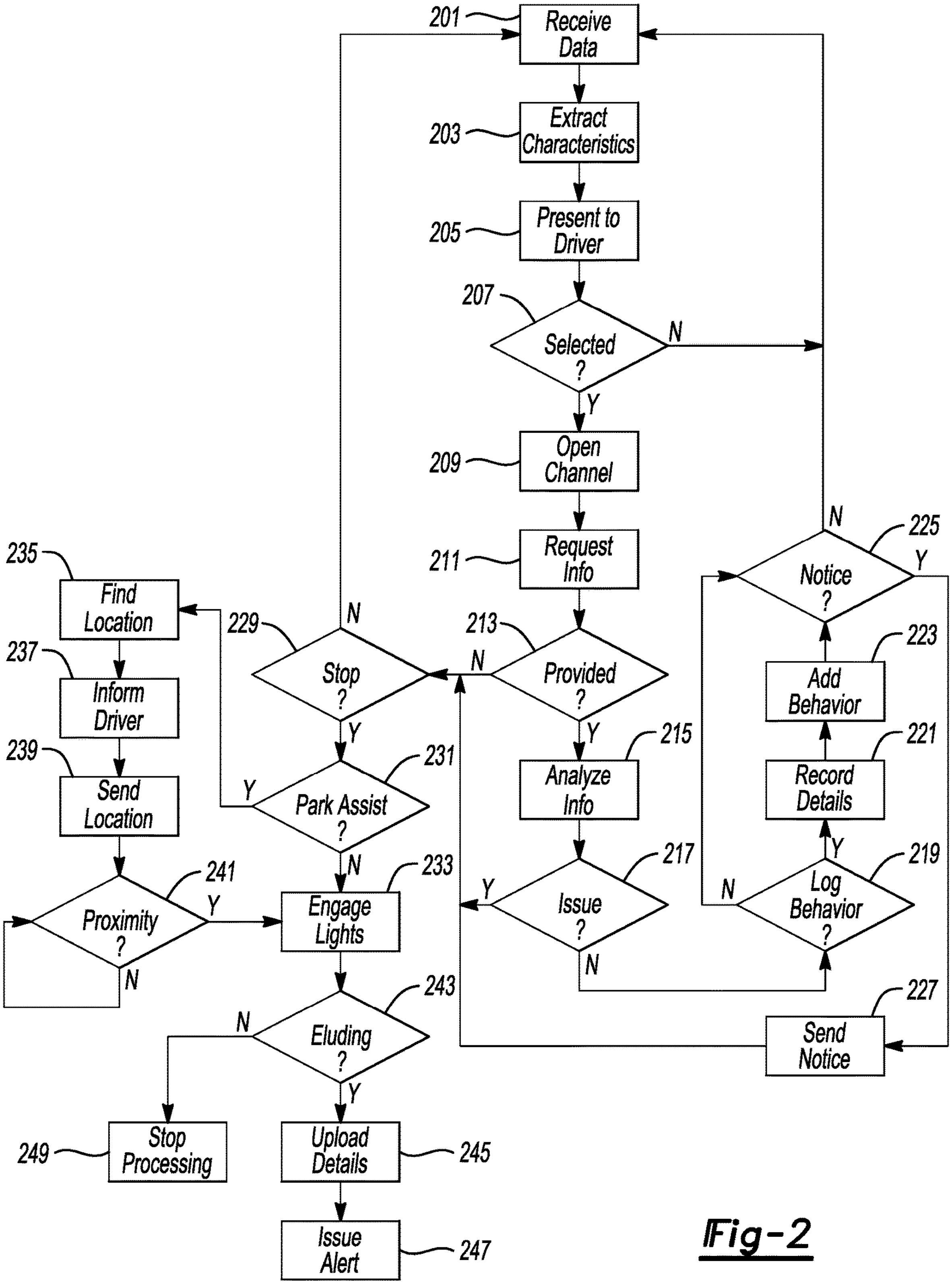
FIG. 2 shows an illustrative process for V2V interaction between a motorist and enforcement vehicle.

FIG. 2 shows an illustrative process for V2V interaction between a motorist and enforcement vehicle. Motorist vehicles 100 may broadcast a BLUETOOTH receivable identification signal upon ignition. This signal can be used by an enforcement vehicle to identify a vehicle and, with permission, connect to the identified vehicle. The signal may also include identifying characteristics, such as license plate, make, model, color, etc. This allows an enforcement vehicle to receive a plurality of such signals and present meaningful information to an officer relating to the surrounding vehicles in range. The profile may be user-editable with regards to, for example, license plates, and may be static in its identification of the other vehicle characteristics. In other examples, changeable features such as color (which can be changed with a paint job) may also be editable. Users may be mandatorily required by a locality to keep the parameters accurate, or this can be voluntarily done.

An officer driving in traffic may identify a black sport utility vehicle (SUV) with plates ABC123. There may also be several other vehicles present. If the SUV and other vehicles are broadcasting signals, the enforcement vehicle may receive these signals at 201 and extract vehicle identification characteristics included in the signals at 203. The signals may also be encrypted in some format, if desired, so that only enforcement vehicles can decrypt and utilize the signals, although in at least one scenario, the signal may include little more than the identifying characteristics, making it unsuitable for general nefarious use.

Once the characteristics have been extracted at 203, the enforcement vehicle may present a list of local vehicles to the enforcement officer at 205. This can include a selectable list and may have suitable characteristics for vehicle selection. For example, the list may say "PLATE—MAKE, MODEL, COLOR," where each factor is a variable determined from the signal from a respective vehicle. From this list, the officer can select a vehicle of interest at 207. The list may be continually updated as vehicles move in and out of communication range.

Once a vehicle is selected at 207, the enforcement vehicle may establish a communication handshake with the selected vehicle using some form of credential included in the signal. If the broadcast signal is desired to remain free of even this basic communication information, then the enforcement vehicle can rebroadcast a request to the identified vehicle with matching parameters—e.g., "enforcement vehicle seeks to communicate with PLATE—MAKE, MODEL, COLOR." That request can include credentials for the enforcement vehicle and the black SUV, in this example, can respond with a handshake request. The downside of this approach is that it requires an extra broadcast and vehicles moving at 70 miles per hour may move in and out of signal range fairly quickly. The upside is that the initially broadcast signal can remain free of network identifiers.

For the sake of example only, the initially broadcast signal will include sufficient information for the enforcement vehicle to establish a communication session, include a cloud-supported session if the vehicle of interest moves out of local communication range. Once a connection has been established at 209, local or cloud-supported (which can also serve as a backup), the enforcement vehicle can request basic driver information at 211, which can include licensure, registration and insurance documents. If the driver is not mandated to provide such documents (i.e., if it does not occur automatically), then the driver may decline the request. If the documents are not provided at 213, the officer may decide whether a stop is necessary at 229. In some instances, the officer may forego the stop, such as when a minor incident was the basis for the request. It may also be the case that the officer has to select at least one potential infraction that was witness or observed by the enforcement vehicle prior to even sending a request, to prevent enforcement vehicles from overly requesting documents. In that instance, the basis for the request can be recorded to a record, as well as any supporting data, so that a driver can challenge the request if it eventually resulted in a stop but was otherwise unsupported by evidence.

If the driver provides the documents at 213, an onboard process on the enforcement vehicle can analyze the documents at 215 and determine if there is an issue (e.g., expired or invalid documents). In some instances, the response may include an image, from an interior motorist camera, of a driver and an officer or artificial intelligence program can compare the image to an image associated with licensure. In other instances, a driver may have previously input a biometric or code confirming they are the driver, and this can be sufficiently indicative that the driver matches the licensure. If the artificial intelligence approach is used, that may occur in the cloud, which can avoid sending the actual image of the driver to the officer and simply send confirmation of a match.

It is also possible to use the interior motorist camera and a machine learning program to identify objects in the vehicle such as weapons that are in plain sight, which can further be used to notify the officer that the driver or another occupant may be armed, although reliance on such methods may require the weapon to be visible to the camera at an angle or pose that make it clearly a weapon and not another object that may appear to be a weapon, but which is not.

If there is an issue with the documentation at 217, again, the officer may determine whether or not to effect a stop at 229. If there is no issue, the process may ask the officer if any observed behavior (e.g., from the enforcement vehicle sensors) should be logged at 219. It is also possible that the motorist vehicle sent back data indicative of object vehicle behavior, which can reveal that the vehicle did not speed above a threshold and/or justifiably swerved, for example, and the officer may also choose to log this behavior as evidence as to why a stop was not effected. Through rule or social contract, speeds within a tolerance of a speed limit (e.g., 5 miles per hour over or less) may not be sufficient justification for a stop, except when the speed limit is very low, for example. This can provide a driver with added incentive to share data, since virtually every driver will exceed the speed limit, at least momentarily, at some point during a drive.

If the officer does not elect to log the data at 219, the enforcement vehicle or officer may provide a notice to the motorist at 225, such as sending at 227 a message that says "thank you for your assistance, have a nice day," or that may include an alert such as "you were observed traveling at excessive speeds, please attempt to drive more closely with the posted speed limits, have a nice day." In the latter case, the motorist will know that they were effectively alerted but not cited, and such instances, without an actual stop, can create enhanced compliance with limits but also remove some of the general unease that may be felt when traveling proximate to an enforcement vehicle.

If the data or observed behavior justifies a stop, the officer may choose to log the behavior at 219. This can result in addition of any motorist-provided data and/or vehicle data to a behavior file at 223, which could have been created at 221 or at an earlier point. Official records of data may be required at some point in the communication process earlier than this point, or can be created when the officer logs data in anticipation of a stop.

If the officer intends to stop the vehicle, the notice may be elected at 225 and sent at 227 and may state, for example, "please prepare to participate in a stop." Even such a notice, while it may not be what the driver wants to hear, can be less jarring than the immediate activation of a siren. Further, if and when a siren is activated, the driver knows it is for them, so they do not accidentally drive away, giving the appearance of elusion.

The officer can then effectuate a stop protocol at 229, which can include, for example, park assistance at 231. When the stop is effectuated in relatively reasonable (from a passing motorist perspective or other environmental) location, no parking assistance may be needed, and the message sent at 227 may say "please pull your vehicle over at the nearest opportunity." This may be accompanied by a siren and/or light engagement at 233 from the enforcement vehicle, for example. In other environments, such as a busy highway, the message may say "please prepare to participate in a stop, you will be provided with suggested pull off locations momentarily."

In that instance, a cloud processing system or motorist camera or sensors working with the cloud can identify one or more suitable locations at 235 (either immediately proximate or within a reasonable distance) for the motorist to pull over. This can include large clear stretches of road shoulder, or may involve exiting a road to a slower side road or parking lot. A motorist attempting to exit, in the absence of such agreement, may be perceived as eluding, so this can assist in letting the officer know that the exit is within an intent to comply with the requested stop.

In this example, the drivers of both vehicles are notified of one or more stopping locations at 237 determined to be suitable (which may include reasonable braking distances and traffic maneuvering—e.g., not an immediate instruction to pull across four lanes of traffic and aggressively brake). The locations can be sent to the vehicles at 239 to serve as navigation destinations, which can be voluntarily or automatically added to a navigation system. Also, in this example, since active communication has been ongoing between the two vehicles, the process waits until the motorist vehicle approaches the stopping point at 241 before engaging lights and/or sirens at 233.

Since the motorist has been provided with a stop location in at least some examples, the motorist can travel to the location at correct traffic speeds and with correct maneuvering, and does not have to manipulate travel so as not to be perceived as eluding. A cloud based process can track where the motorist is located relative to a stop point (when established) and thus the two vehicles do not necessarily need to remain in close proximity up to the stop. If the motorist passes the stop, or if the officer perceives the motorist as eluding the stop at 243, then the process can upload the details of the situation at 245 for addition to a data record and issue an alert directly to the motorist at 247, which may provide the motorist with a chance to explain if a communication channel is open. The alert at 247 can also be issued to other enforcement vehicles if necessary. Otherwise, once the officer and motorist have reached a stopping point, the process can engage in a stop processing protocol at 249.

Figure 3:
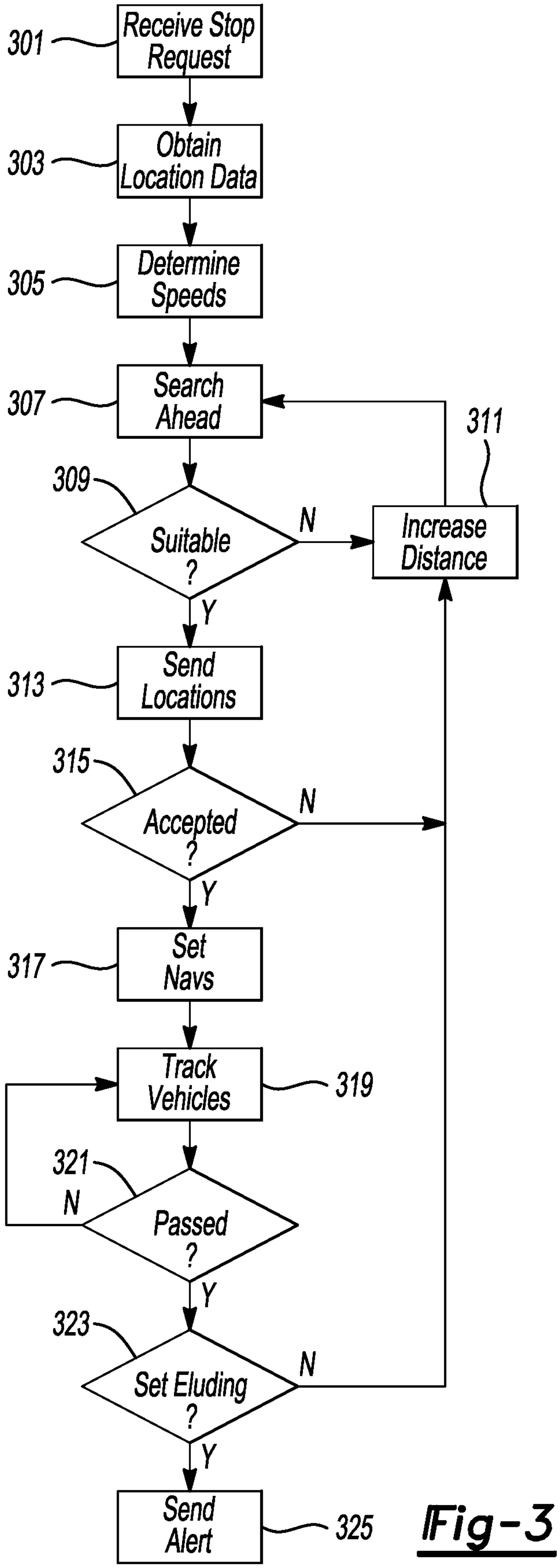
FIG. 3 shows an illustrative process for stop assistance handling.

FIG. 3 shows an illustrative process for stop assistance handling. This is an example of a process that can use current context (where the motorist is located, time of day, speeds, traffic, weather, etc.) to determine a suitable stopping location.

The process receives a stop assistance request at 301, which may identify the locations and speeds of the motorist and/or enforcement vehicles. This data can also be obtained by the cloud on the basis of a communication link established between the two vehicles. Either included in the message, or obtained based on vehicle identifiers, the process can also obtain the location data at 303 and determine or obtain the current speeds of the vehicle or vehicles at 305. Based on these and similar variables (e.g., without limitation, inclement weather, time of day, etc.) the process can search a predetermined distance ahead of the motorist vehicle at 307. This search may accommodate some expectations about slowing and manuvering, so that a search for a vehicle traveling at 70 mph may be further out than that for a vehicle traveling at 30 mph, at least initially. The search may have to reach possible covered areas in inclement weather (e.g., heavy downpour) and/or well-lit or populated areas late at night. In this manner, the search can dynamically accommodate current context.

If a suitable location can be found at 309, that location can be sent to both vehicles at 313. If there is no suitable location found, based on, for example, predefined requirements correlated to current context, then the search may have to expand the distance at 311 and re-search. For example, it may be the case that a vehicle is 20 miles from the nearest exit and traveling at 2 AM, in the rain, on a highway with moderate traffic. Parameters may dictate that a stop on the highway could include potential issues, given speeds, darkness and weather, so the search may have to expand all the way to 20 miles down the road prior to finding a suitable location. As long as both vehicles understand where the stop is to occur, any misunderstanding about why the motorist is not immediately stopping can be prevented, and both vehicles can travel to the designated exit to stop on a surface road or parking lot away from the traffic. If the location, once sent, is accepted at 315 by at least the officer and/or motorist if both parties are given the option to agree, then the process can automatically set a destination in navigation systems of both vehicles at 317. Otherwise, the search can expand at 311 and continue.

Since the vehicles in this example have an agreed-upon destination, they can travel further apart than is conventional for these scenarios, and the cloud can track both vehicle locations at 319. If the motorist passes the location (or an exit or other necessary manuver point where a manuver is not made) at 321, the process can indicate that the motorist may be eluding at 323 and issue an alert at 325. While the process may not regularly track the vehicle, in this example, the motorist had already given permission for communication and tracking, so the process can continue to track vehicle location, which disincentivizes elusive behavior. The alert can first go to the motorist at 325, giving them a chance to explain via open communication, and then, if necessary be issued to other enforcement vehicles.

Figure 4:
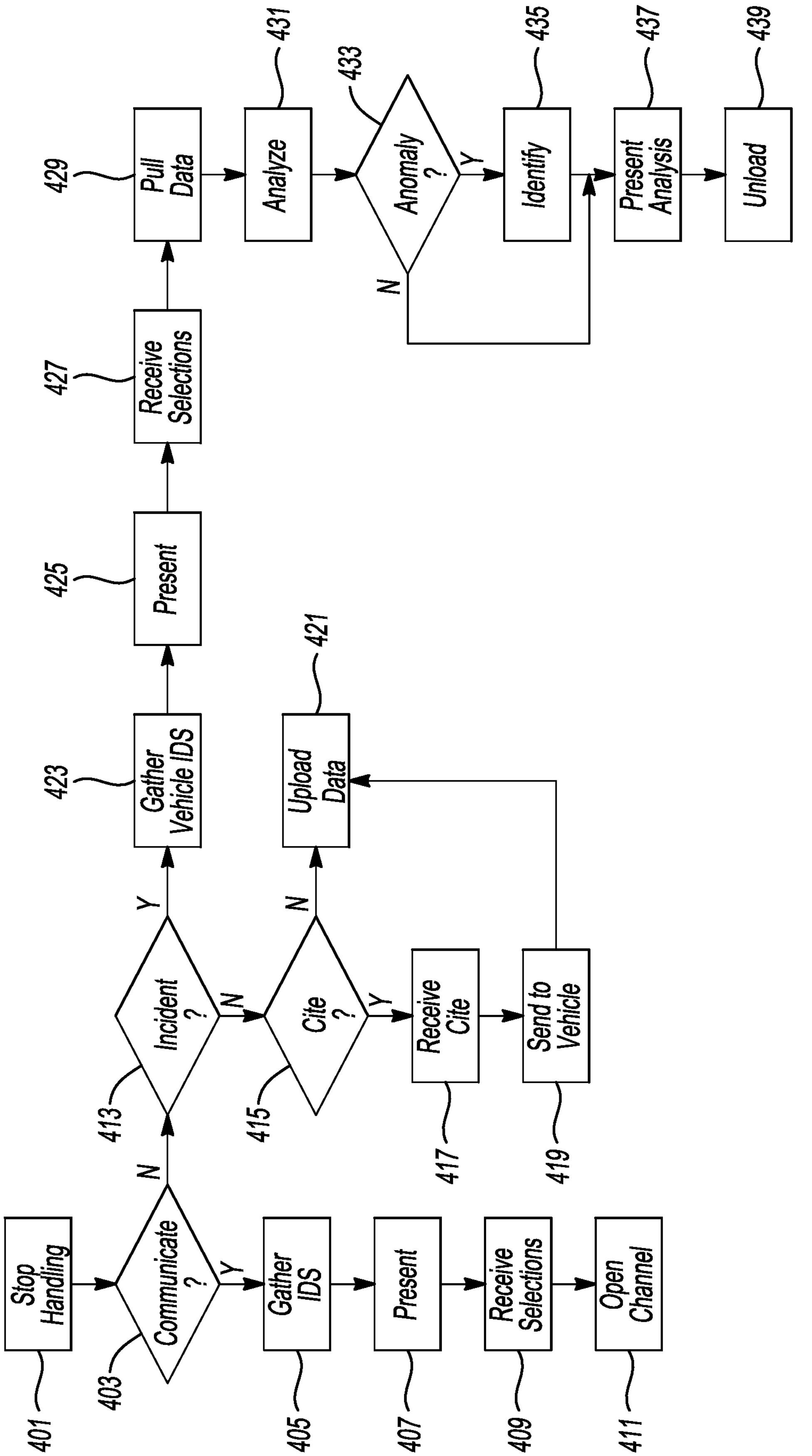
FIG. 4 shows an illustrative stop-handling process.

FIG. 4 shows an illustrative stop-handling process. This is an illustrative non-limiting example of a process that can be used when a stop is requested, although some amount of this process, if not all of it, can occur using communication between a motorist and enforcement vehicle prior to an actual stop ever occurring.

In this example, the stop handling process begins at 401, which may involve an active communication request from the enforcement vehicle at 403. This process also covers what may occur when an enforcement vehicle arrives on the scene of an incident, and so communication prior to arrival may not always be present in those instances. Although not necessarily the case, for the sake of this example the communication established at 403 can include pre-stop communication (i.e., before the vehicles are both actually parked), although the communication could also occur between stopped vehicles.

If there is not already a communication channel established with a reference motorist vehicle, the process can, as with FIG. 2, gather surrounding vehicle identifiers at 405 and present those selectably at 407. Upon receiving selection of a reference/object motorist vehicle at 409, such as through an in-vehicle display of the enforcement vehicle, the process can open a communication channel at 411. The communication channel may provide data, voice and/or video communication between the two vehicles.

If the stop does not relate to an incident at 413, which can include incidents involving more than one vehicle, the process proceeds with a single motorist approach at 413. If the officer indicates an intent to issue a citation at 415, the relevant data may be input into the enforcement vehicle at 417, and this data can also be added to a record of the full stop, including any communication, documentation exchanged, and/or observations made by sensors of the enforcement vehicle. A record of the citation, as well as a link to the data record and/or a complete version of the data record can be sent to the motorist vehicle 100 at 419. Motorists may be entitled to such records, and the cloud may also store a record of all the stop-related data for motorist retrieval in a manner that assures the record is fully accessible and unalterable.

If a citation is not to be issued, e.g., if the officer simply wants to issue an alert or if the vehicle was stopped because of a potential problem, for example, the process may still create and upload a record of all stop-related data at 421, and the motorist may still receive a link or copy of the record upon request. A copy of any citation may also be stored in conjunction with the record, for motorist reference, when citations are issued.

If there is an incident involving one or more vehicles at 413, the process may again gather local vehicle identifiers at 423. If the vehicles are unpowered, this may require the vehicles to be powered, if broadcast and data are not available from unpowered vehicles (using, for example, an authorized wake command). The officer, arriving on the scene, can be presented with the list of local vehicle identifiers at 425 and can select the involved vehicles at 427.

Other vehicles present may volunteer to serve as witness vehicles as well, even if not involved in the incident, as they may have sensor or camera data not available from any of the involved vehicles. This can include, for example, speeds of vehicles involved as observed from the perspective of witness vehicles, maneuvering, braking and camera footage of the actual incident occurring. Those vehicles may also be selected by the officer, if those vehicles, for example, stop at the incident and offer to serve as witness vehicles. Because vehicles will eventually include some number of autonomous vehicles, and those autonomous vehicles may include significant sensor and camera capabilities, some autonomous vehicles observing an incident may stop and "volunteer" data as observed by their sensors. All of the relevant data can be added to a record of the incident with permission of the necessary parties.

Once the vehicles are selected, the enforcement vehicle may request a record of data from each vehicle for some time period leading up to the incident at 429. This may require permission of the various vehicles (and drivers) or may be mandatory when an incident occurs. Drivers may also give permission as to who can view their data—i.e., if there is a dispute about fault, a driver may elect not to share their data with other drivers, unless otherwise obligated to do so.

In this example, an AI process can also analyze the data at 431, which may further be done in conjunction with infrastructure data, such as local camera data and/or signal-control data. For example, if the data from vehicles was timestamped, it may be possible to compare that to signal control data to determine which vehicle violated the signal, how fast vehicles were traveling when the signal was violated, whether a vehicle was moving through a yellow or red signal, how long a decision to speed up upon a yellow occurred relative to the change to yellow and proximity to the intersection, etc.

Sensor data and vehicle protection system deployment data may indicate which vehicle struck which other vehicle and where, travel speeds at time of encounter, locations of vehicles at encounter, etc., most of which is very difficult to reconstruct by simply observing the aftermath of an incident and listening to two narratives from two very different perspectives. The AI process may be designated to seek clear anomalies (e.g., traveling against a red light) or other obvious indications of fault (e.g., one vehicle was permissibly stationary when involved) and if such anomalies present at 433, the AI may notify the officer of what appears to have occurred at 435. In other examples, the analysis may simply result in factual output that is not necessarily dispositive, and the overall analysis can be presented to the officer at 437 and uploaded for recordation, with permissions or as mandated, at 439.

Figure 5:
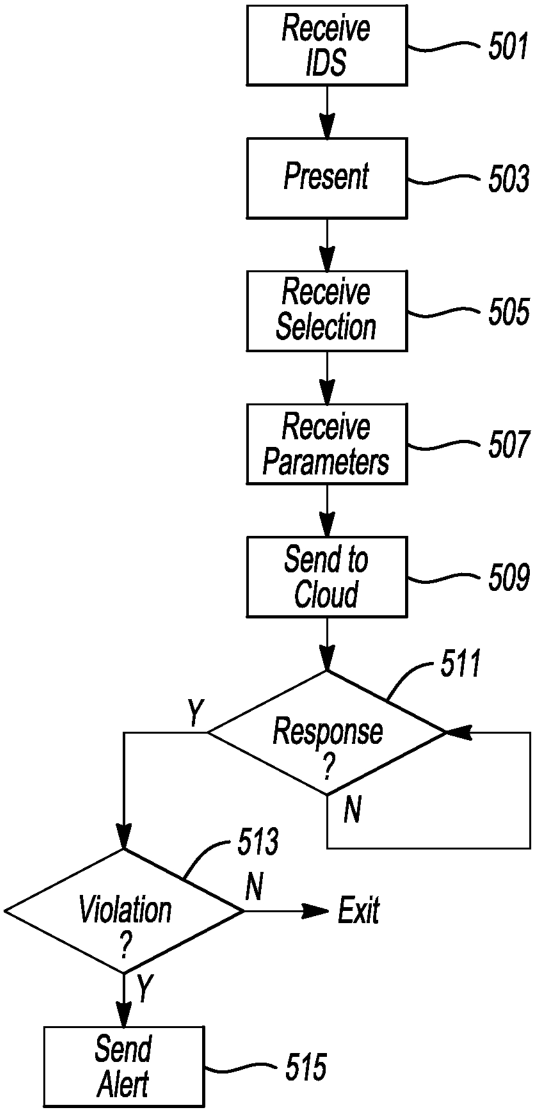
FIG. 5 shows an illustrative toll enforcement handling process.

FIG. 5 shows an illustrative toll enforcement handling process. As previously noted, vehicles that can record and report travel data can be charged segmental tolling without the need for interaction with toll booths. On conventional toll roads, these vehicles can be charged as though they had a drive-through pass, based on segments used. On other toll roads, such as a road where everyone may currently be charged a flat rate, such vehicles can enable usage-based tolling to more accurately reflect charges based on actual road usage.

Of course, if such toll roads do not have toll booths ensuring that everyone on the road has passed through a booth, then there will be some desire monitor toll payments and enforce required toll payments. While the cloud can handle such payments, whether by calculating them based on vehicle data or simply using an online account to pay based on instructions from a vehicle, enforcement entities may believe that there are certain vehicles on the road that are not paying their share. In some models, road usage charge (RUC) payments will replace traditional road taxes like fuel taxes, and every vehicle may simply be required to make payments based on some amount of actual road usage. Especially in those models, it is important to be able to ensure that everyone using the roads is paying their shares, and so enforcement vehicles may be interested in continually tracking RUC payments at random to ensure vehicle payments.

Moreover, if the vehicle payments are calculated onboard, and the price or number of segments is relayed to the server, enforcement bodies may want to ensure that no one has tampered with the calculation or variables (price, time, distance, class, etc.) onboard the vehicle. To that end, an enforcement vehicle encountering a group of vehicles can received broadcast identifications from one or more vehicles at 501, present the identities of those vehicles at 503, and receive selection of one or more vehicles for monitoring at 505.

The enforcement vehicle may pass arguments to the motorist at 507, such as an instruction to begin RUC calculation and when to stop (after a time or distance) calculating. The enforcement vehicle can begin its own comparable calculation for the vehicle based on distance, time, class, etc., or that calculation can be done by an enforcement agency in the cloud.

In one model, the enforcement vehicle can follow the motorist to perform the calculation based on actual road usage as observed—i.e., the enforcement vehicle knows the motorist traveled X distance of road because that was observed. In another model, the enforcement vehicle can receive GPS breadcrumbs from the motorist and/or the cloud can receive GPS breadcrumbs from the motorist and use those as the basis to perform a comparison calculation. To assist in cloud-based comparison, the enforcement vehicle can also pass the required parameters (those passed to the motorist) to the cloud at 509.

The motorist can then travel the specified distance or time as requested by the parameters. While this is occurring, the vehicle can perform its native RUC calculation as well as gather GPS breadcrumbs or other location data during the specified period. While a motorist may not prefer to be tracked in such a manner, this is effectively in lieu of them being followed by an enforcement vehicle, and many people would rather simply report the required data as opposed to actually be followed for some length of road mileage. Moreover, the motorist may be able to decline the data reporting required by the remote RUC comparison calculation and, in that instance, the enforcement vehicle would simply follow them and perform its own comparison calculation.

At some point, the motorist vehicle will complete the specified travel requested by the RUC calculation audit and report a response to the server and/or a following enforcement vehicle at 511. When the response is to the enforcement vehicle, it may simply consist of any parameters that would be used to calculate a charge, which can include, based on what RUC model is implemented, simply the price of the charge itself. When the response is to a cloud-auditing program, the response may also include the breadcrumbs and/or data reflecting the total road usage based on the breadcrumbs, which can be used for calculating a comparison for audit.

If the comparisons do not match at 513, that is, if the vehicle indicates a lower charge to be applied, or variables indicating a lower than accurate charge, then the process may send an alert to the enforcement vehicle or appropriate agency at 515. Similarly, the cloud may issue an alert to an enforcement agency.

In some models the enforcement agency may want to pull over the offending vehicle at or near the time of determined offense, and so following the vehicle to verify its calculation gives both assurances that the audit calculation is accurate and unaltered, as well as provides an opportunity to stop the vehicle. In other instances, the result of the failed audit may simply be a mailed citation, and since the identification of the audited vehicle (and thus, presumably, the ownership and address) is already known, not succeeding with an audit can result in a mailed citation with no interaction between the driver and officer being necessary.

While not following the vehicle could provide the driver an opportunity to alter the audit data as well, it may usually be the case that most drivers who are attempting to subvert the usage of RUC payments may pay a 3 rd party to make alterations, and that those 3 rd parties will not always be able to keep ahead of (in coding principles) audit tracking as well, since there may not be any particular indications that the vehicle is temporarily tracking data through a secondary process at a granular level for audit purposes. In an additional alternative, RUC based roads (e.g., highways and main roads) may include periodic transceivers, and the tracking of the vehicle can be done based on communication between the vehicle and such transceivers (e.g. Wi-Fi or other transceivers), which will reveal whether the vehicle passed the transceivers or not, and thus provide a breadcrumb style trail that is likely unalterable. Were the vehicle to somehow prevent such communication, in an attempt to circumvent the audit, it would have to "fake" a manuver leading away from transceivers or at least provide some number of communication points, otherwise it would appear as though the vehicle had simply vanished—e.g., a vehicle midway between exits on a highway that ceased communication would appear to either be intentionally blocking communication or simply having vanished. Because providing some version of remote tracking frees the enforcement vehicle up to engage with other vehicles, some level of potential interference may be tolerated—but in other models, the enforcement vehicle can continue to follow the object vehicle for the duration of the audit and use communication with the object vehicle for comparison and enforcement purposes.

Figure 6:
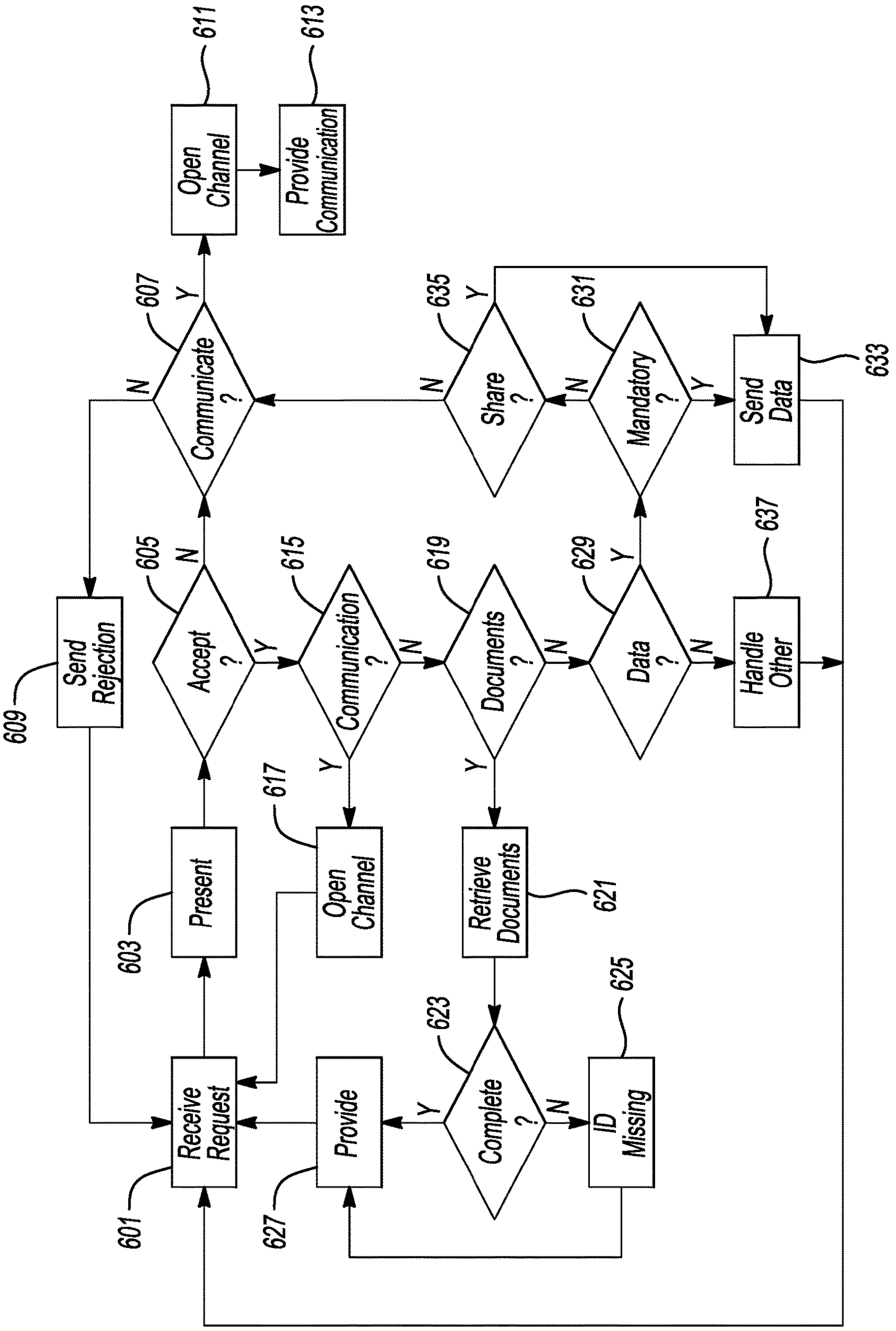
FIG. 6 shows an illustrative vehicle-side example of request handling.

FIG. 6 shows an illustrative vehicle-side example of request handling. In this example, a vehicle may receive a request from an enforcement vehicle at 601, which can include a request for data or a request to open a communication channel. The motorist vehicle receiving the request can present the request to the occupants at 603, unless compliance is mandatory, and the occupants can choose to accept or deny the request at 605.

The request may be identified as having come from an enforcement vehicle, and while the occupant responding to the request may not be excited about the possibility of being stopped or cited, they may still realize that compliance with the request may lead to the least likelihood of an unfavorable outcome. In other instances, depending on what is being requested (documents, open communication, video feeds, etc.) the vehicle may have an obligation to respond to certain aspects of the request.

An officer may think it suspicious if a driver declines the request at 605, but the driver may also have a valid reason. For example, if the driver is driving someone with a medical emergency to a hospital, complying with a stop request or having a discussion with an officer may not be in the best interest of the person experiencing the emergency. Accordingly, when the request (e.g., a stop assist request, but also any other request) is declined at 605, the occupant can be given an opportunity to open communication with the enforcement vehicle at 607. Moreover, if there are concerns about unauthorized users submitting requests to a vehicle, any request from an enforcement vehicle may include certain predefined parameters which can be verified by at least one of the vehicle or the cloud. For example, a vehicle can verify that the request includes some form of identifier appended by an enforcement vehicle that confirms the request is from an enforcement vehicle, and/or the cloud can, when available, also confirm the validity of the request, such as, for example, confirming that a known enforcement vehicle just issued such a request and that identifiers associated with the received request match identifiers associated with the just-issued request.

In another instance, a driver may decline, for example, a data request, because the relevant data has not been uploaded to a driver account. For example, if a driver just switched insurance or updated registration, and if that information is not automatically added to a cloud-based or vehicle-stored record, then the driver may not have added the information yet. The driver may decline the data request and notify the officer, via communication 607, that the driver can provide physical evidence of the updated information if the officer effects a stop. Opening a communication channel allows a driver an option to explain why they declined to agree to a certain request, if the driver so desires. Accordingly, if the driver elects to open communication after denial of a request, the motorist vehicle can request communication with the enforcement vehicle at 611, which can include communication over any currently established channels or opening of a new channel at 611, and then provide communication at 613 when the channel is opened or permitted to transmit communication.

If the motorist accepts the request—i.e., the motorist agrees to the request, the process demonstrates a few non-limiting examples of what may occur on the vehicle responsive to different requests. If the request is a communication request at 615, that is, if the officer seeks to communicate via audio or video with the occupants of the motorist vehicle, the vehicle may open a channel or use a current channel for communication at 617. This can also include permitting a current channel to be used in conjunction with vehicle video or audio, as appropriate.

If the request is a documents request at 619, the vehicle may retrieve documents at 621. This can include retrieving the documents from memory, or, for example, obtaining the documents from one or more remote sources. For example, data may be stored in the cloud with respect to a user account for all documents related to the vehicle. Or the vehicle may pull insurance documents from an insurance provider, registration and licensure from the secretary of state, etc. In other examples, the user may have a mobile device that stores one or more accounts or documents, and the vehicle may pull the information from the account, with permission.

If the document set is complete at 623, the vehicle may provide the documents responsive to the request at 627. This can include sending digital records over an open data communication channel. If there are missing documents, e.g., the vehicle cannot pull certain documents, those documents have not been put in a place accessible by a vehicle, or even when a document indicates an expired state, the vehicle may identify for the driver which documents are missing or deficient at 625 and provide any up-to-date documents at 627. That can include provision of deficient (e.g., expired) documents if the driver so requests.

In still a further example, the officer may request vehicle travel data at 629 as described above. If the driver is not mandated to deliver such data at 631, then the driver can elect to approve or decline the request. If delivery of data is mandatory at 631, then the vehicle can provide at least the amount of data that must be mandatorily delivered at 633. Alternatively, the driver can elect to share data at 633, which can include the requested data and any other data the driver may think is useful to the situation. For example, an officer may request data from the last minute, but the driver may elect to share data from the last 10 minutes, to demonstrate that any speeding observed in the last minute was simply a momentary event. Data can also be consolidated by the motorist vehicle in various forms, either automatically or responsive to a request, so that, for example, instead of transmitting a record of speed at every moment over the last 10 minutes, the vehicle can send a synopsis indicating, for example, that speeds were within a tolerance of the limit for 99% of the last 10 minutes and exceeded the tolerance for 1% of the time.

Any other requests (e.g., coordination of a stop location assistance request) can be handled at 637. Also, similar to the refusal to respond to the request at 605, if the user declines to share data at 635, or declines any other specific request from the enforcement vehicle, the user may be provided with an option to request communication, giving the user an opportunity to explain things to the officer and helping to maintain trust and keep situations deescalated.

By providing situations where the motorist vehicle can act in an enforcement scenario, personal encounters with enforcement can be kept to a minimum and the motorist vehicle can often help facilitate a smooth resolution of what is often a tense situation. Since the vehicle may be a "trusted" entity in terms of information provision, officers can query the vehicle under various permissible circumstances and make decisions about eventual actions. Motorists can also demonstrate, through data, their general compliance and potentially not receive citations by being able to prove the truth of something on the spot. A data record can also be kept of any encounters, to provide the motorists with complete information if any citation is challenged.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An enforcement vehicle comprising:

one or more processors configured to:

receive a plurality of vehicle broadcasts from motorist vehicles, each including vehicle identification information;

present at least an aspect of the identification information in a selectable manner on a display of the enforcement vehicle, allowing for selection of one or more of a plurality of vehicles identified by the broadcasts;

receive selection of one or more of the plurality of vehicles;

send communication requests to the selected one or more vehicles, including designation of the request as having come from the enforcement vehicle;

receive confirmation from at least one vehicle with which communication was requested, resulting in an open communication channel with the at least one vehicle;

receive identification of information to be provided from the at least one vehicle;

send an information request to the at least one vehicle for the identified information;

responsive to receiving a response to the information request, determine whether information included in the response indicates compliance with at least one predefined requirement; and responsive to non-compliance with the at least one predefined requirement, alert an occupant of the enforcement vehicle of the existence of and at least one characteristic of the non-compliance.

2. The vehicle of claim 1, wherein the information included in the response includes documentation including one or more expiration dates, and the predefined requirement includes a requirement that none of the expiration dates have passed.

3. The vehicle of claim 1, wherein the information included in the response includes data indicating vehicle travel speeds at one or more locations and the predefined requirement includes a requirement that a limit defined for at least one of the one or more locations was not exceeded by more than a threshold by a vehicle travel speed at the one or more locations as indicated by the information included in the response.

4. The vehicle of claim 1, wherein the information included in the response includes a result of a tolling-related calculation performed by the at least one vehicle and the predefined requirement includes a requirement that the result of the tolling-related calculation match a result of a tolling-related calculation performed by the enforcement vehicle.

5. The vehicle of claim 1, wherein the one or more processors are further configured to, responsive to non-compliance, automatically activate at least one of sirens or lights provided to the enforcement vehicle.

6. The vehicle of claim 1, wherein the one or more processors are further configured to, responsive to non-compliance, determine a stop location conforming to predefined parameters, based on present travel conditions within a proximity of the enforcement vehicle and send the stop location to the at least one vehicle.

7. The vehicle of claim 6, wherein the determination of the stop location is further based on conformation to predefined parameters within a proximity of the at least one vehicle based on a location of the at least one vehicle included in the received response.

8. The vehicle of claim 6, wherein the one or more processors are further configured to:

maintain communication with the at least one vehicle and receive location information from the one vehicle;

determine that the location information indicates that the at least one vehicle has passed the stop location by more than a threshold; and responsive to the at least one vehicle passing the stop location, issue an alert to at least one of the at least one vehicle or an occupant of the enforcement vehicle.

9. The vehicle of claim 8, wherein the one or more processors are further configured to:

determine whether at least one of the at least one vehicle, based on the location information, or the enforcement vehicle based on onboard location information, are within a predefined proximity to the stop location; and responsive to at least one of the at least one vehicle or the enforcement vehicle being within the predefined proximity, automatically activate at least one of sirens or lights provided to the enforcement vehicle.

10. The vehicle of claim 6, wherein the predefined parameters include at least one of a defined proximity to roads having a posted speed limit, a defined proximity to observed vehicular travel above a threshold speed limit, a known presence of lighting, a known presence of cover, or a known presence of designated parking.

11. The vehicle of claim 6, wherein the present travel conditions include at least one of volume of present traffic, speeds of present traffic, time of day, ambient light, or weather.

12. A method executable by one or more processors of an enforcement vehicle comprising:

receiving a plurality of vehicle broadcasts from motorist vehicles, each including vehicle identification information;

presenting at least an aspect of the identification information in a selectable manner on a display of the enforcement vehicle, allowing for selection of one or more of a plurality of vehicles identified by the broadcasts;

receiving selection of one or more of the plurality of vehicles;

sending communication requests to the selected one or more vehicles, including designation of the request as having come from the enforcement vehicle;

receiving confirmation from at least one vehicle with which communication was requested, resulting in an open communication channel with the at least one vehicle;

receiving identification of information to be provided from the at least one vehicle;

sending an information request to the at least one vehicle for the identified information;

responsive to receiving a response to the information request, determining whether information included in the response indicates compliance with at least one predefined requirement; and responsive to non-compliance with the at least one predefined requirement, alerting an occupant of the enforcement vehicle of the existence of and at least one characteristic of the non-compliance.

* * * * *